(No Model.) 2 Sheets—Sheet 1.
H. MARTIN.
FLOUR SIEVE.
No. 382,541. Patented May 8, 1888.
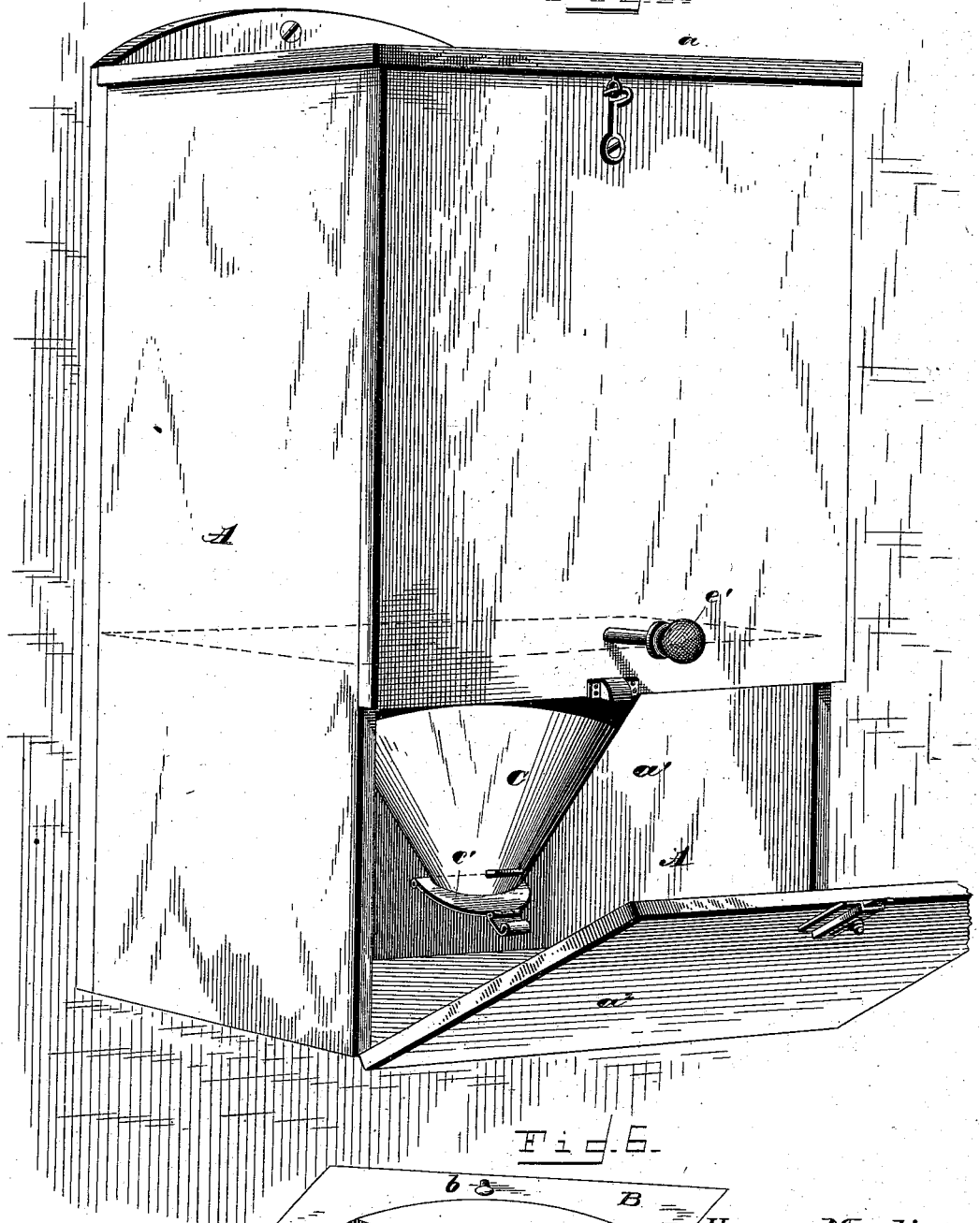
Fig. 1.
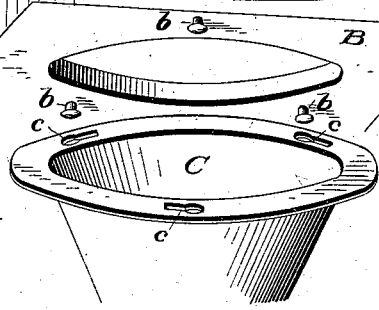
Fig. 6.
WITNESSES
G. S. Elliott
E. W. Johnson
Henry Martin
INVENTOR
Attorney

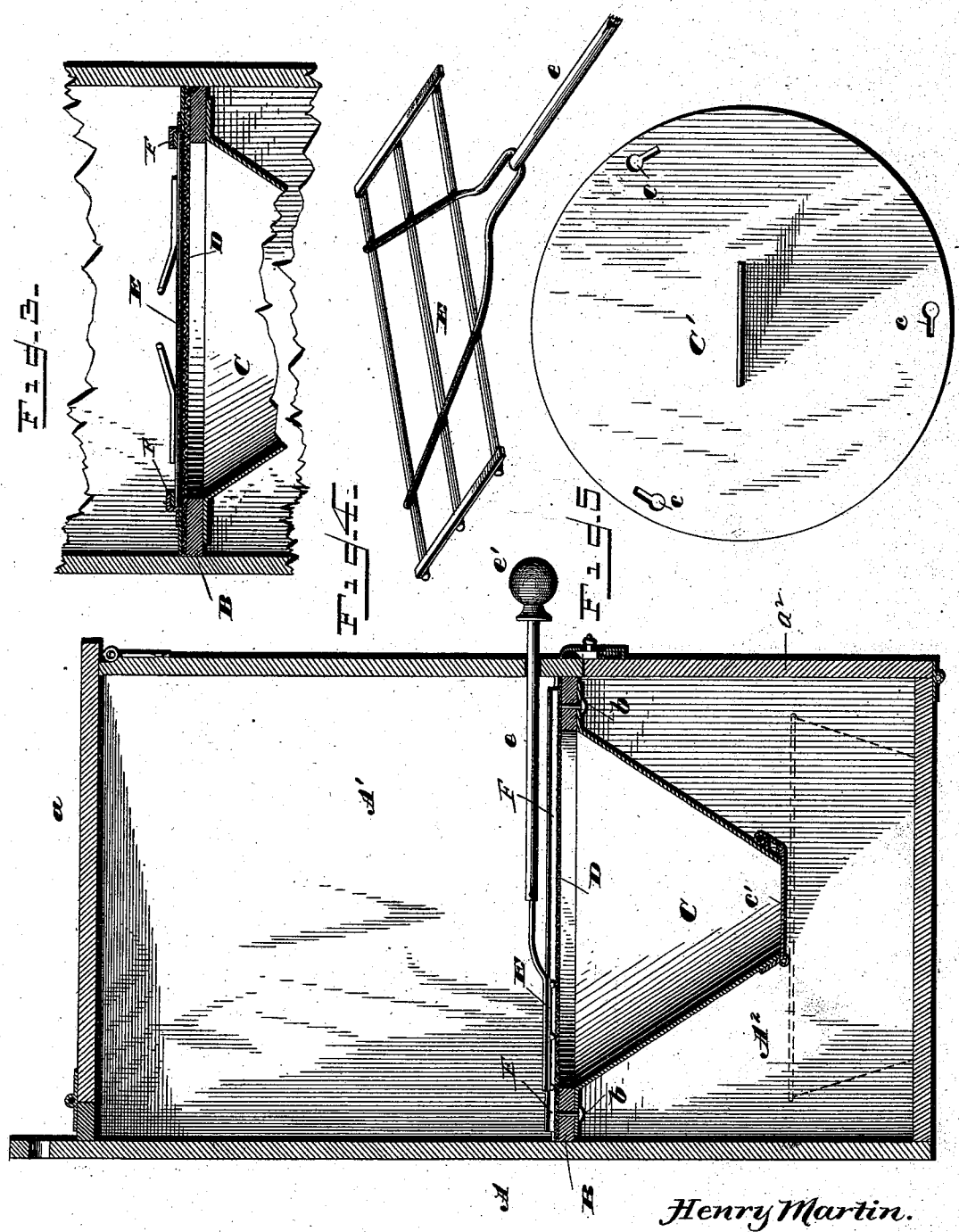

UNITED STATES PATENT OFFICE.

HENRY MARTIN, OF CORTLAND, ILLINOIS.

FLOUR-SIEVE.

SPECIFICATION forming part of Letters Patent No. 382,541, dated May 8, 1888.

Application filed February 10, 1887. Serial No. 227,158. (No model.)

*To all whom it may concern:*

Be it known that I, HENRY MARTIN, a citizen of the United States of America, residing at Cortland, in the county of DeKalb and State of Illinois, have invented certain new and useful Improvements in Flour-Sieves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of household receptacles for flour, &c., arranged to sift the flour as it is withdrawn from the receptacle for use.

A device of this character embodying my improvements will be fully described in the following specification, and the novel features and combinations pointed out in the claims.

In the accompanying drawings, Figure 1 is a perspective view of a flour-receptacle embodying my improvements. Fig. 2 is a vertical section thereof, taken from front to rear through the center. Fig. 3 is a sectional detail taken through the sieve and agitator. Fig. 4 is a perspective view of the agitator. Fig. 5 is a bottom plan view of a closing-plate. Fig. 6 is a perspective view illustrating the ledge and funnel disconnected.

A case, A, of suitable shape and proportions, is provided at top with a lid, $a$, and at the front, near the bottom, with an opening, $a'$, closed by a door or slide, $a^2$. Interiorly the case is provided at a point just above the top of opening $a'$ with a projecting ledge, B, provided on its under side with headed studs or hooks $b$ to interlock with slots or projections $c$, formed in or upon the discharge-funnel C and closing-plate C'. The ledge B is also provided with a sieve, D, above and in contact with which is arranged an agitator, E. This agitator E reciprocates in guides F, arranged to maintain the agitator in contact with the sieve, and is provided with a handle, $e$, the outer end of which projects through an opening in the case, and is provided with a knob or other suitable hand-hold, $e'$.

The lower end of the discharge-funnel C is provided with a movable bottom, $c'$, adapted to be closed to retain sifted flour within the funnel or to be opened to admit of the passage of sifted flour to a vessel supported below it. The lower end of the discharge-funnel is quite small relatively, in order that sifted flour may be conducted into a tea-cup or other small vessel.

In use a quantity of flour will be deposited in the upper chamber, A', of the case, and the lid $a$ closed and secured to prevent the admission of dust or other foreign matters. When it is desired to use a portion of the flour, a vessel may be placed in the chamber A$^2$ beneath the funnel, the movable bottom or gate $c'$ opened, and the agitator E reciprocated by means of its handle $e'$. To prevent fine flour-dust escaping from the case into the apartment, the door or slide $a^2$ may be closed during the sifting operation.

As the discharge-funnel C is removably secured to the ledge B and provided with a hinged bottom or gate, $c'$, I avoid the necessity of using a separate vessel in which to receive the sifted flour, as the bottom, $c'$, may remain closed during the sifting operation, and when a sufficient quantity of flour has been sifted the funnel may be detached and removed, a closing-plate, C', being temporarily secured in its place to prevent any flour falling through the sieve into the lower chamber, A$^2$, of the case.

I claim—

1. In a flour receptacle and sifter, the combination of a closed case, a horizontal frame with headed pins in its under side, a sieve secured to the upper side thereof, so as to divide the interior of the case into upper and lower chambers, an agitator secured within the case to be reciprocated horizontally in contact with the upper surface of the sieve, and a discharge-funnel having a flange with key-hole slots suspended within the case just below the sieve-supporting frame, so as to be detachable therefrom, the lower portion of the case having in one side a hinged door, substantially as shown.

2. In a flour receptacle and sifter, the combination of a closed case, a horizontal frame and sieve dividing the case into upper and lower chambers, a reciprocating agitator above the sieve, and a discharge-funnel removably secured to the frame, said funnel being provided at its lower end with a hinged bottom for closing the same, substantially as shown.

3. In a flour receptacle and sifter, the combination, substantially as described, of the case, a horizontal ledge projecting inward from the walls of the case between its ends, a sieve secured upon said ledge to divide the case into upper and lower chambers, headed studs projecting from the lower surface of the ledge, and a funnel provided at its lower end with a hinged bottom and at its upper end with a flange having key-hole slots to engage the headed studs of the ledge.

In testimony whereof I affix my signature in presence of two witnesses.

HENRY MARTIN.

Witnesses:
J. S. HARROUN,
S. T. ARMSTRONG.